(12) United States Patent
Sham

(10) Patent No.: US 10,155,530 B2
(45) Date of Patent: *Dec. 18, 2018

(54) VEHICLE CONTROL SYSTEM FOR CONTROLLING STEERING OF VEHICLE

(71) Applicant: THUNDER POWER NEW ENERGY VEHICLE DEVELOPMENT COMPANY LIMITED, Central (HK)

(72) Inventor: Wellen Sham, Taipei (TW)

(73) Assignee: THUNDER POWER NEW ENERGY VEHICLE DEVELOPMENT COMPANY LIMITED, Central (HK)

(*) Notice: Subject to any disclaimer, the term of this patent is extended or adjusted under 35 U.S.C. 154(b) by 0 days.

This patent is subject to a terminal disclaimer.

(21) Appl. No.: 15/420,980

(22) Filed: Jan. 31, 2017

(65) Prior Publication Data
US 2017/0137052 A1 May 18, 2017

Related U.S. Application Data

(63) Continuation of application No. 15/008,416, filed on Jan. 27, 2016, now Pat. No. 9,586,618.
(Continued)

(51) Int. Cl.
*B62D 1/28* (2006.01)
*B62D 15/02* (2006.01)
(Continued)

(52) U.S. Cl.
CPC .............. *B62D 1/286* (2013.01); *B60K 28/00* (2013.01); *B60K 35/00* (2013.01); *B62D 1/00* (2013.01);
(Continued)

(58) Field of Classification Search
CPC .... B62D 1/286; B62D 5/0457; B62D 15/021; G06T 7/73; G06T 7/20;
(Continued)

(56) References Cited

U.S. PATENT DOCUMENTS

| 6,766,036 B1 | 7/2004 | Pryor |
| 7,289,645 B2 | 10/2007 | Yamamoto et al. |

(Continued)

FOREIGN PATENT DOCUMENTS

| CN | 101032405 A | 9/2007 |
| JP | H11234958 A | 8/1999 |

(Continued)

OTHER PUBLICATIONS

U.S. Appl. No. 15/008,416, filed Jan. 27, 2016, Non-Final Rejection dated Jul. 6, 2016, all pages.
(Continued)

*Primary Examiner* — Marthe Y Marc-Coleman
(74) *Attorney, Agent, or Firm* — Kilpatrick Townsend & Stockton LLP

(57) ABSTRACT

Embodiments provide a vehicle control system comprising a projecting device, a camera device, a control device and an actuating device. The vehicle steering control system does not need a physical steering wheel, thus the weight and cost of the vehicles can be reduced. In addition, the steering control system according to the present invention provides the drivers with brand new driving experience.

16 Claims, 6 Drawing Sheets

Related U.S. Application Data

(60) Provisional application No. 62/150,848, filed on Apr. 22, 2015, provisional application No. 62/133,991, filed on Mar. 16, 2015, provisional application No. 62/274,110, filed on Dec. 31, 2015.

(51) Int. Cl.

| | | |
|---|---|---|
| *B62D 5/04* | (2006.01) | |
| *G06F 3/03* | (2006.01) | |
| *G06T 7/20* | (2017.01) | |
| *G06T 7/73* | (2017.01) | |
| *B62D 1/00* | (2006.01) | |
| *B60K 28/00* | (2006.01) | |
| *G06F 21/74* | (2013.01) | |
| *B60K 35/00* | (2006.01) | |
| *G06K 9/00* | (2006.01) | |
| *G06K 9/52* | (2006.01) | |
| *G06K 9/62* | (2006.01) | |
| *G06T 7/60* | (2017.01) | |
| *H04N 7/18* | (2006.01) | |
| *H04N 9/31* | (2006.01) | |
| *G06T 7/70* | (2017.01) | |
| *G06T 7/246* | (2017.01) | |

(52) U.S. Cl.
CPC ......... *B62D 5/0457* (2013.01); *B62D 15/021* (2013.01); *B62D 15/025* (2013.01); *G06F 3/0304* (2013.01); *G06F 21/74* (2013.01); *G06K 9/00355* (2013.01); *G06K 9/52* (2013.01); *G06K 9/6215* (2013.01); *G06T 7/20* (2013.01); *G06T 7/246* (2017.01); *G06T 7/60* (2013.01); *G06T 7/70* (2017.01); *G06T 7/73* (2017.01); *H04N 7/18* (2013.01); *H04N 9/3179* (2013.01); *B60K 2350/2052* (2013.01); *B60Y 2200/11* (2013.01); *B60Y 2200/12* (2013.01); *B60Y 2200/14* (2013.01); *B60Y 2200/30* (2013.01); *B60Y 2200/50* (2013.01); *B60Y 2200/80* (2013.01); *B60Y 2400/83* (2013.01); *G06T 2207/30196* (2013.01); *G06T 2207/30268* (2013.01); *Y02T 90/124* (2013.01)

(58) Field of Classification Search
CPC ........ G06T 2207/30268; G06F 3/0304; B60Y 2200/11; B60Y 2200/12; B60Y 2200/30; B60Y 2200/50; B60Y 2200/80; B60Y 2400/83
USPC ....... 701/41; 359/201.2, 630; 345/7; 353/13, 353/14
See application file for complete search history.

(56) References Cited

U.S. PATENT DOCUMENTS

| | | |
|---|---|---|
| 8,625,855 B2 | 1/2014 | El Dokor |
| 9,586,618 B2 | 3/2017 | Sham |
| 2007/0077541 A1 | 4/2007 | Champagne et al. |
| 2009/0278915 A1 | 11/2009 | Kramer et al. |
| 2011/0128555 A1 | 6/2011 | Rotschild et al. |
| 2011/0292079 A1 | 12/2011 | Hosoi et al. |
| 2014/0081521 A1 | 3/2014 | Frojdh et al. |
| 2014/0121927 A1 | 5/2014 | Hanita |
| 2015/0072619 A1 | 3/2015 | Abdurrahman et al. |
| 2015/0317527 A1 | 11/2015 | Graumann et al. |
| 2015/0367859 A1* | 12/2015 | Roth ............... B60K 37/00 701/36 |
| 2016/0272242 A1 | 9/2016 | Sham |

FOREIGN PATENT DOCUMENTS

| | | |
|---|---|---|
| JP | 2007253640 A | * 10/2007 |
| JP | 2007253640 A | 10/2007 |
| JP | 2011121554 A | 6/2011 |

OTHER PUBLICATIONS

U.S. Appl. No. 15/008,416, filed Jan. 27, 2016, Notice of Allowance dated Oct. 24, 2016, all pages.
First Chinese Office Action with Search Report for CN201610142899 dated Aug. 31, 2017, 6 pages.
European Office Action dated May 22, 2018 in the corresponding European appiication(application No. 18155712.5).

\* cited by examiner

VEHICLE CONTROL SYSTEM FOR CONTROLLING STEERING OF VEHICLE

CROSS-REFERENCES TO RELATED APPLICATIONS

This application is a continuation of U.S. Nonprovisional application Ser. No. 15/008,416, filed on Jan. 27, 2016 titled "VEHICLE CONTROL SYSTEM FOR CONTROLLING STEERING OF VEHICLE," which claims the benefit of and priority of U.S. Provisional Application No. 62/274,110, filed on Dec. 31, 2015 titled "VEHICLE CONTROL SYSTEM FOR CONTROLLING STEERING OF VEHICLE", which claims the benefit and priority of U.S. Provisional Application No. 62/133,991, filed on Mar. 16, 2015 titled "IMPROVEMENTS TO ELECTRIC VEHICLES", and the benefit and priority of U.S. Provisional Patent Application No. 62/150,848, filed on Apr. 22, 2015 titled "IMPROVEMENTS TO ELECTRIC VEHICLES," the disclosures of each of which are herein incorporated by reference in their entirety for all purposes.

TECHNICAL FIELD

The present invention relates to a vehicle control system and an electric vehicle using the vehicle control system, the vehicle control system being used for controlling the steering of a vehicle.

BACKGROUND OF THE INVENTION

The steering of the existing vehicle is commonly carried out by controlling a physical steering wheel, so that the steering and torque amounts are detected by a torque sensor which then is used to control a power source in a steering assist system, so as to assist steering by an engine driving an oil pump or by a motor producing an assisting force. No matter which type of steering assist system is used, as the beginning of a steering operation, a physical steering wheel is indispensable.

BRIEF SUMMERY OF THE INVENTION

The present invention aims to provide a vehicle control system for controlling steering of a driving apparatus without a physical steering wheel.

According to a first aspect of the present invention, a control system for controlling steering of the driving apparatus is provided. The control system can comprise an image projection device, a camera device, a processor, an actuation device, and/or any other components. The image projection device can be configured to project a steering wheel image within the driving apparatus. The camera device can be configured to take an image of a motion of one or two hands on the steering wheel image. The processor can be configured to determine a position of the one or two hands according to the image of the one or two hands, to calculate a movement of the one or two hands, to determine a steering angle and a steering direction according to the movement of the one or two hands, to output a control signal according to the steering angle and steering direction and/or any other operations. The actuating device can be configured to receive the control signal and to effectuate a control the driving apparatus according to the control signal.

According to a second aspect of the present invention, an electric vehicle is provided, including the vehicle control system according to the first aspect of the present invention.

According to a third aspect of the present invention, a vehicle control method for controlling the steering of a driving apparatus is provided. The method comprises the following steps: projecting a steering wheel image; taking images of an operator's hand(s) on the steering wheel image; determining a positions of the operator's hand(s) according to the images of the hand(s); calculating a movement of the hand(s); determining a steering angle and a steering direction according to the movement of the hand(s); and outputting a control signal to an actuating device according to the steering angle and the steering direction, so as to control the driving apparatus.

In comparison to the prior art, the vehicles using the steering control system according to the present invention does not need to use a physical steering wheel, thus the weight and cost of the vehicles can be reduced. In addition, the steering control system according to the present invention provides the drivers with brand new driving experience.

BRIEF DESCRIPTION OF THE DRAWING

The present invention is further described in detail below with reference to the accompanying drawings, wherein.

DETAILED DESCRIPTION OF THE INVENTION

Embodiments of the vehicle control system according to the present invention are described below with reference to the accompanying drawings.

Figure 1:
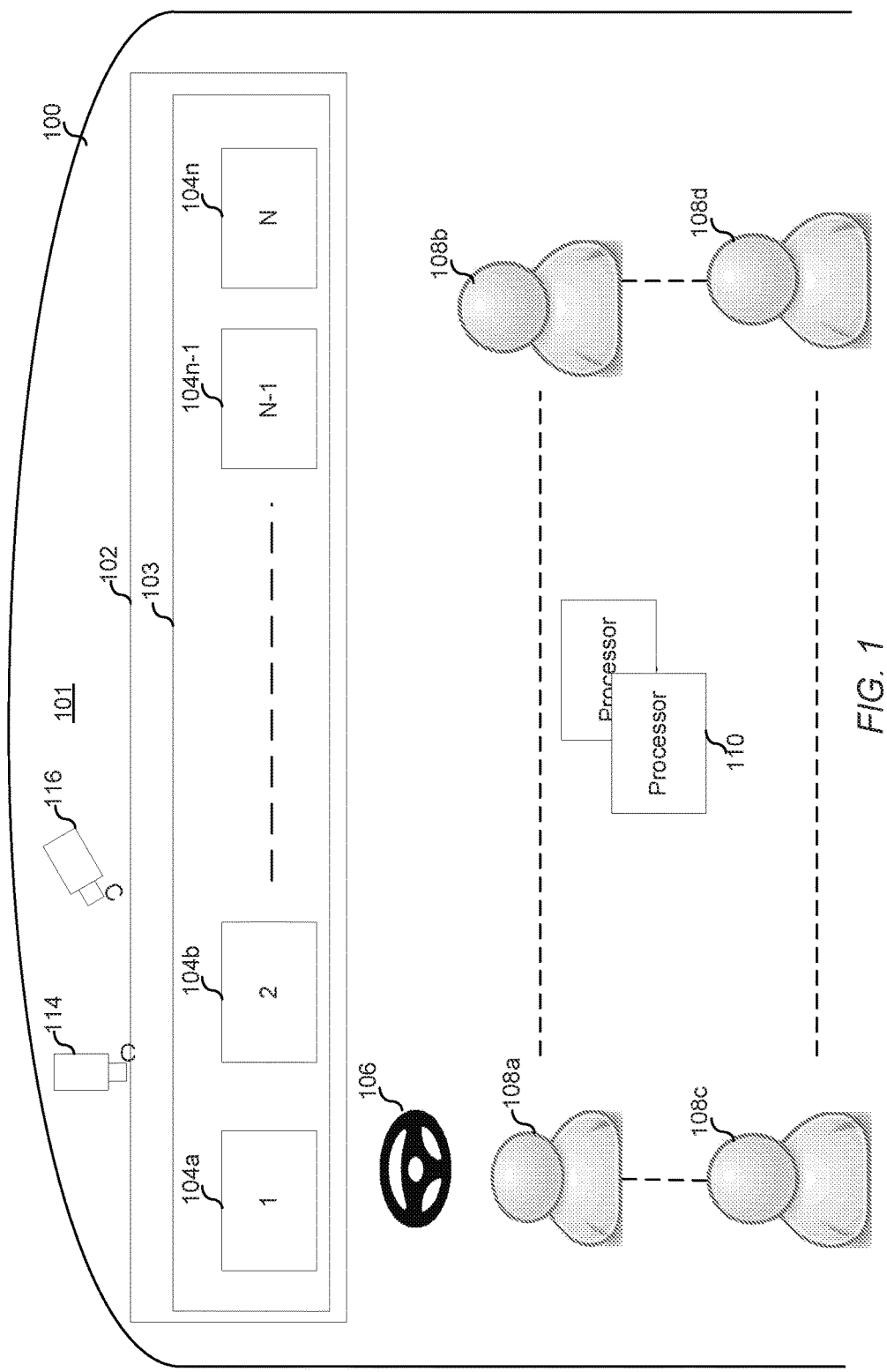
FIG. 1 generally illustrates an example of a driving apparatus 100 in accordance with the disclosure.

FIG. 1 generally illustrates an example of a driving apparatus 100 in accordance with the disclosure. The driving apparatus 100 may include any apparatus that moves in distance. Examples of driving apparatus 100 may include a vehicle such as a car, a bus, a train, a truck, a tram, or any other type of vehicle; may include a vessel such as a boat, a ship, a barge, a ferry or any other type of watercraft; may include an aircraft such as an airplane, a spaceship, or any other type of aircraft; or may include any other transportation apparatus. In one example, the driving apparatus 100 is an electrical automobile. As shown, the driving apparatus 100 may include a cabin 101 with a volume.

As shown in FIG. 1, in the cabin 101, there may be a dashboard 102 that has a screen 103. Although in this example, a dashboard screen 103 occupies the entire surface of the dashboard 102, this is not intended to be limiting. It is contemplated that in some cases, the dashboard screen 103 may occupy a portion of the dashboard 102 instead of the entire dashboard 102. In any case, the dashboard screen 103 is suitable to display one or more information panels, such as the information panels 104 shown in FIG. 1. In implementations, the dashboard screen 103 may include any display technology, such as liquid-crystal display (LCD), crystal LCD, light-emitting diode (LED), organic light-emitting diode (OLED), active-matrix organic light-emitting diode (AMOLED), Plasma, projection panel, cathode ray tube (CRT), and/or any other display technology.

In some examples, information presented in the information panels 104 may include gauge information related to the transportation apparatus 100, such as current speed/altitude/direction/wind, current longitude/latitude, distance traveled, RPM, fuel level, battery level, and/or any other gauge information related to the transportation apparatus 100. In some examples, information presented in the information panels 104 may include indication information, such as seat belt, airbag, door, trunk, maintenance, safety, window lock, door lock indication information or any other indication information. In some examples, information presented in the information panels 104 may include navigational or GPS information related to navigation of the driving apparatus 100, such as current street traveled on, map of an area the transportation apparatus 100 is traveling in, the destination information, direction instructions, traffic condition, estimated arrival time, estimated delay due to traffic, and/or any other navigation information. In some examples, information presented in the information panels 104 may include cabin information, such as current temperature, humidity, wind speed, number of passengers in one or more zones in the cabin 101 and/or any other cabin information. In some examples, information presented in the information panels 104 may include configuration information regarding the transportation apparatus 100, such as seat configuration, mirror configuration, battery configuration, driving mode configuration, and/or any other configuration. In some examples, information presented in the information panels 104 may include entertainment information. For example, such an information panel may include a video screen capable of presenting a video or still images, a browser screen capable of presenting web information, a game screen capable of presenting one or more games for user interaction, a music information screen capable of enabling a user to consume music pieces, e-commerce information screen capable of enabling a user to engage remote transaction via the Internet, radio information screen capable of presenting a list of radio stations available for user consumption, and/or any other type of infotainment screen. In some examples, information presented in the information panels 104 may include notification information such as incoming call, incoming text message, incoming video chat request, and/or any other notification information. Other examples of information panels 104 are contemplated.

As still shown in FIG. 1, the driving apparatus 100 may comprise one or more virtual steering wheels 106 in the cabin 101. As will be described in further detail, the virtual steering wheel 106 can be projected from an image projection device installed in the driving apparatus 100. Although only one virtual steering wheel 106 is shown in FIG. 1, this is not intended to be limiting. In some examples, the driving apparatus 100 may include more than one virtual steering wheel 106.

As also shown in FIG. 1, one or more users 108 may be arranged to occupy their corresponding positions in the cabin 101. The users 108 may include one or more drivers that control the virtual steering wheel 106, one or more passengers, and/or any other type of users 108. In this example, the user 108a is a driver that controls the driving of the driving apparatus 100, while other users 108, e.g., users 108b-d, are passengers. As still shown, there may be multiple rows of users 108 within the cabin 101 of the transportation apparatus 100.

As still shown in FIG. 1, driving apparatus 100 may include one or more processors 110 configured to control one or more electrical system or subsystems in driving apparatus 100. Types of processor 110 may include generic processor configured to execute machine-readable instructions configured to implement a control mechanism to control a control structure the driving apparatus 100. As also shown, driving apparatus 100 may include one or more of a projection device 114 configured to project an image of the virtual steering wheel 106 as shown. As also shown, driving apparatus 100 may include one or more of a camera device configured to take an image of one or two hands of an operator of the driving apparatus on the virtual steering wheel 106.

Figure 2:
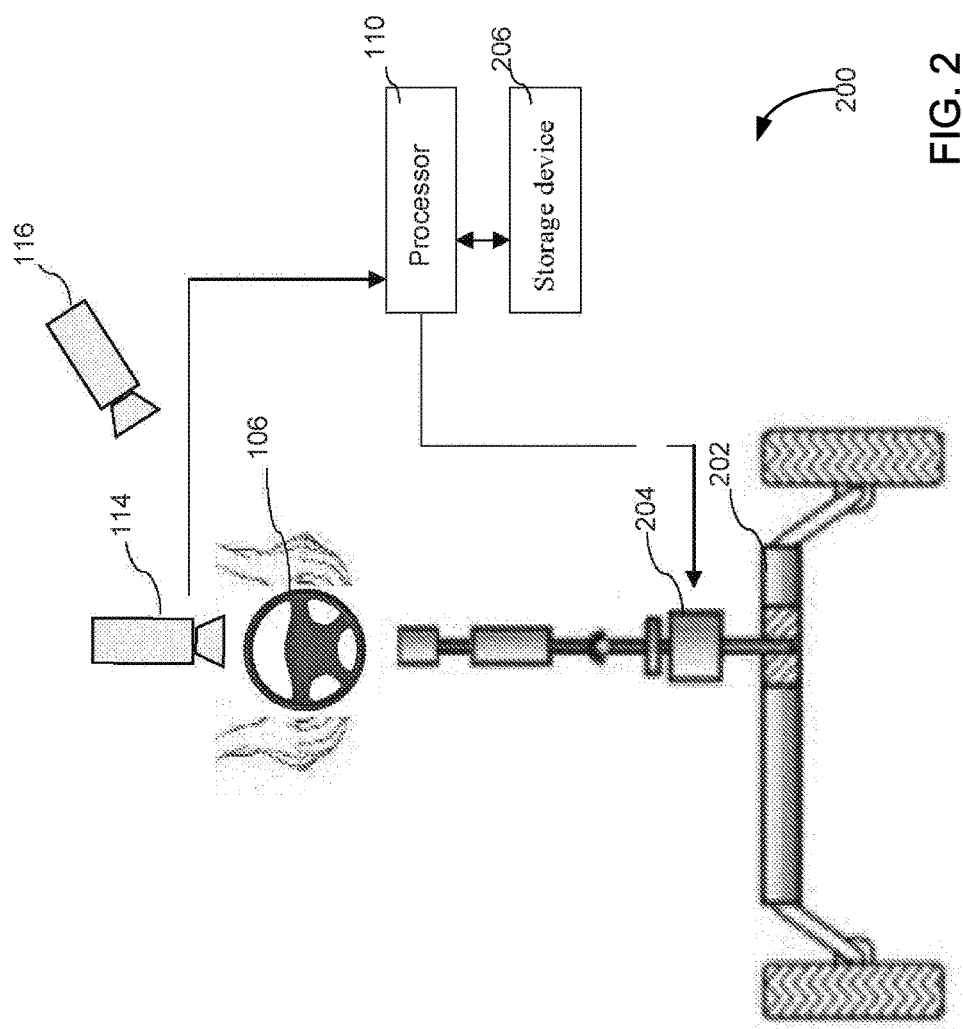
FIG. 2 shows a structural schematic diagram of a control system in accordance with one example of disclosure.

With the driving apparatus 100 having been generally described, attention is now directed to FIG. 2, where a schematic diagram of a control system 200 in accordance with the disclosure is illustrated. The control system 200 can installed in the driving apparatus 100. It will be described with reference to FIG. 1. The control system 200 can comprise the projection device 114, the camera device 116, a processor 110, a steering motor 204 serving as an actuating device, a steering structure 202, a storage device 206 and/or any other components. As mentioned above, the projection device 114 can be configured to project a steering wheel image 106 within the cabin of the driving apparatus 100. In one embodiment, the projection device 114 projects the steering wheel image 106 in front of a driver seat.

The camera device 102 can be configured to take an image of a motion of one or two hands of an operator of the driving apparatus 100 on the steering wheel image 106. In some implementations, the camera device 102 may be configured to take such an image periodically, e.g., once every 1/1 ih seconds, 1/24th seconds, every 1/3 dh seconds, and so on. The images taken by the camera device 102 may be stored in the storage device 206 and may be processed by the control device 202.

Figure 3:
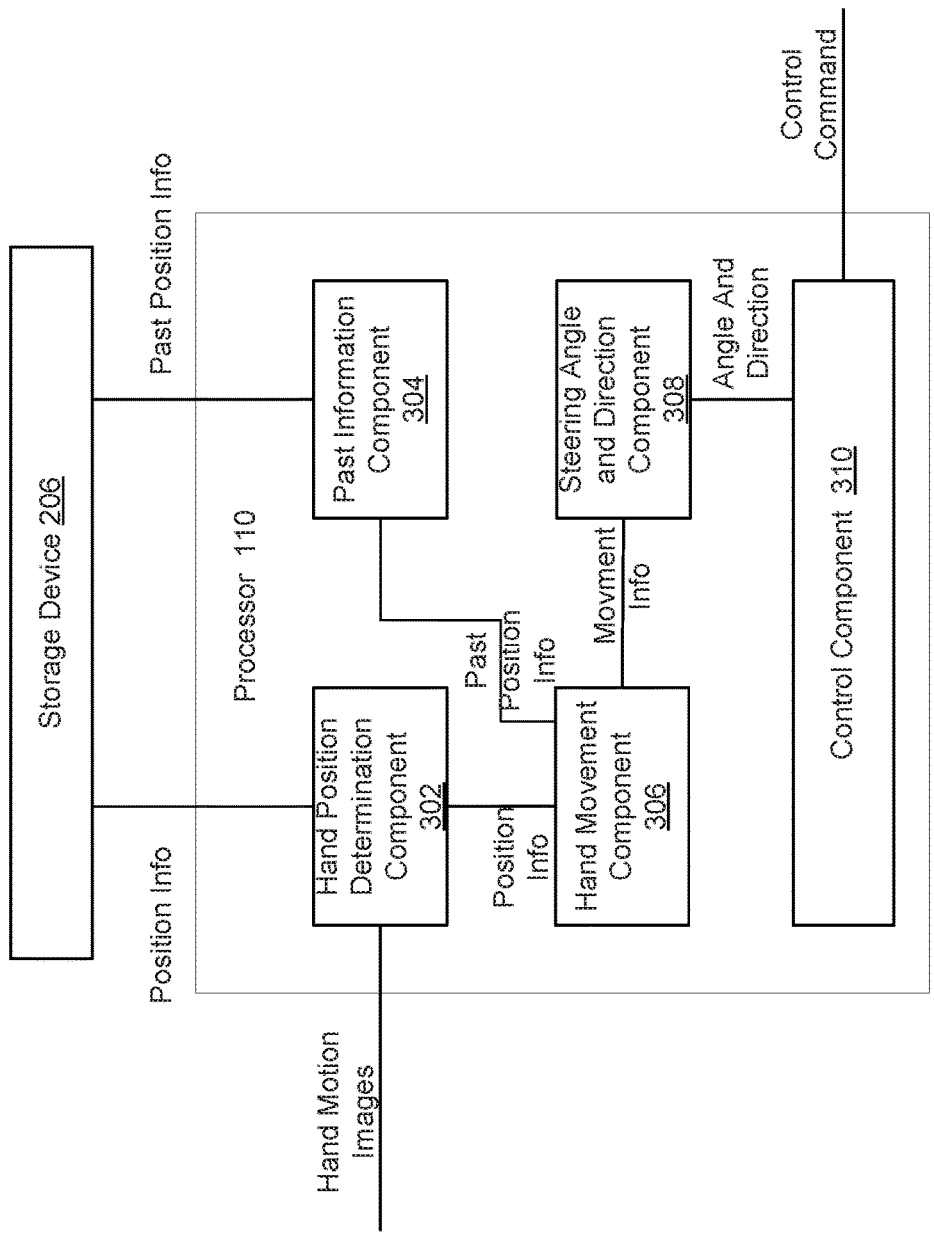
FIG. 3 illustrates an exemplary configuration of processor for implementing the control mechanism in accordance with the disclosure.
Figure 4:
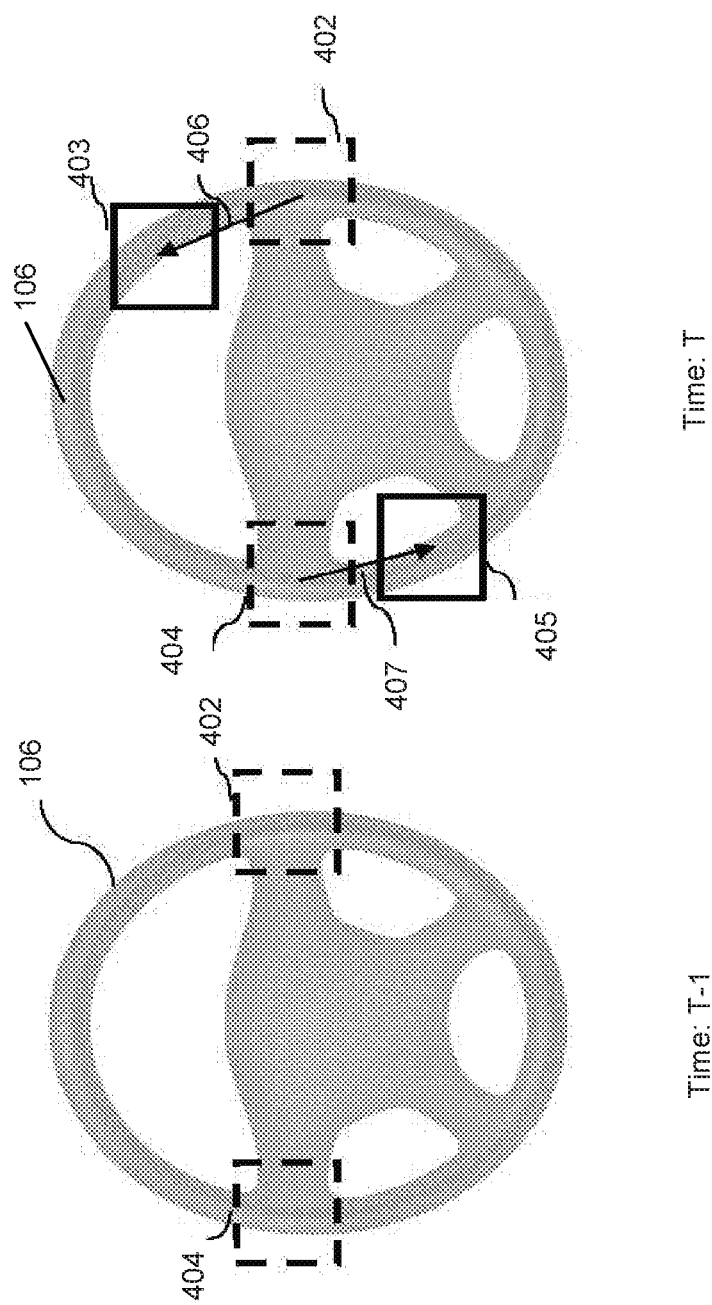
FIG. 4 shows a schematic diagram of a method for calculating movement position difference vectors according to the present invention.

The processor 110 can be configured to perform various operations to implement a control mechanism to control a maneuver of the driving apparatus 100. FIG. 3 illustrates an exemplary configuration of processor 110 for implementing the control mechanism in accordance with the disclosure. As shown, processor 110 may comprise a hand position determination component 302, a past information component 304, a hand movement component 306, a steering angle and direction component 308, a control component 310, and/or any other components. The hand position determination component 302 may be configured to determines the positions of one or two hands on the virtual steering wheel image 106 according to the images of the hand(s) taken by camera device 116. As shown, the hand position determination component 302 may receive such images from the camera device 116 periodically, e.g., once every 1/12th seconds, 1/24th seconds, every 1/3 dh seconds, and so on. The hand position determination component 302 can be configured with image recognition algorithm to recognize a position of the hand(s) on the virtual steering wheel image 106. Referring to FIG. 4 now, the 403 and 405 on the virtual steering wheel image 106 at time T (right) indicates positions of the hands at current time that can be determined by the hand position determination component 302 via an image recognition algorithm. Returning to FIG. 3, once having determined the hand position on the virtual steering wheel image 106, the hand position determination component 302 can be configured to generate the position information and store it in the storage device 206. The storage device 206 can be configured to store hand position information for a period of time as the hand position determination component 302 keep sending the position information at specific time instants periodically.

The past information component 304 can be configured to obtain past position information regarding the hands on the virtual steering wheel image 106. For example, the past information component 304 can be configured to call up hand position information at any previous time instant stored in storage device 206. Referring to FIG. 4 now, position 402 and 404 on the virtual steering wheel image 106 at time TO (left) represent previous hand positions stored in the storage device 206.

Returning to FIG. 3, hand movement component 306 can be configured to calculate a hand movement based on the current position information determined by the hand position determination component 302 and the past position information retrieved by the past information component 304. For example, the hand movement component 306 can calculate a hand movement based on the hand position on the virtual steering wheel image 106 at T1 (current time) and the hand position on the virtual steering wheel image 106 at TO (immediate before T1). Referring to FIG. 4 again, the vector 406 and 407 can be calculated by hand movement component 306 to represent the differences between the positions 403, 405 of the hands in the current cycle and the positions 402, 404 of the hands in the previous cycle.

Returning to FIG. 3, the steering angle and direction component 308 can be configured to determine a steering angle and a steering direction according to the movement position difference vectors determined by hand movement component 306. The steering angle and direction component 308 can be configured to output a corresponding current and voltage as a control signal according to the steering angle and the steering direction, so as to control the steering motor 204. Returning to FIG. 2, the steering motor 204 then outputs power to enable the steering structure 202 to drive vehicle wheels to turn direction. The steering structure 202 can employ a steering rack and a steering gear.

Figure 5:
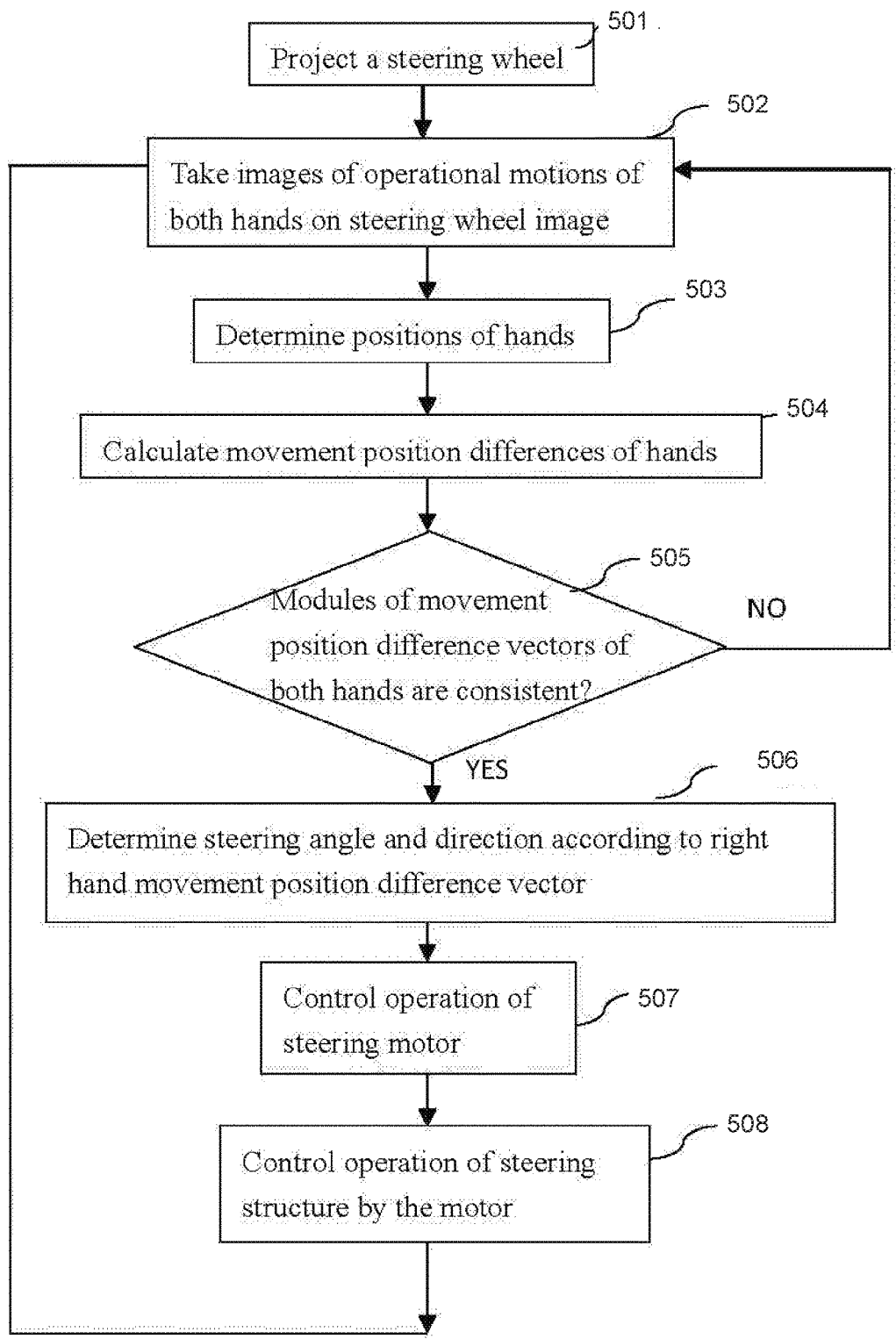
FIG. 5 shows a flow diagram of a vehicle control method according to the present invention.

FIG. 5 illustrates an example of a process 500 for controlling a vehicle using a virtual steering wheel image projected within the vehicle. Process 500 is illustrated as a logical flow diagram, the operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

At Step 501, a projecting device can be used to project a steering wheel image in front of a driver of the vehicle. The specific projecting method may use the method in the prior art known to those skilled in the art, and the specific structure of the projecting device may be that of the existing device capable of realizing air projection.

At 502, the camera device takes images of operational motions of both hands of the driver on the steering wheel image. The shooting range for both hands of the driver in the charge of the camera device is limited within the boundaries of the steering wheel image, namely, the motions of both hands of the driver within the boundaries of the steering wheel image are considered effective steering operational motions, while the motions outside the boundaries of the steering wheel image are considered invalid. Such a configuration can effectively prevent malfunction, so as to improve driving safety.

At step 503, a position of both hands can be determined. In some embodiments, 503 can be performed by a hand position determination component the same or substantially similar to the hand position determination component 302 described and illustrated herein. As described above, the hand position determination component can determine the positions of the hands according to the images of the hands. Specifically, the positions of the hands on the steering wheel image are determined according to the images of the hands in the images taken by the camera device. It should be noted that in the present embodiment, no restrictions are placed on the specific hand gesture of the driver, namely no matter what hand gesture is made by the driver, the positions of the hands will be determined according to the images of the hands, so that the driver may perform steering operation freely by using his habitual operational gesture. Since one cycle of steering control steps is carried out at given intervals, the images of the hands in each cycle of steering control steps are converted to the positions of the hands which are then stored in the storage device.

At 504, movement position differences can be calculated based on the position information determined at 502. In some embodiments, 504 can be performed by a hand movement component the same or substantially similar to hand movement component 306 described and illustrated herein. As described above, the hand movement component can calculate movement position difference vectors according to the positions of the hands. FIG. 4 shows a schematic diagram of a method for calculating the movement position difference vectors according to the present invention.

In order to prevent misjudgment, a checking step is introduced into this embodiment, namely it is checked whether the left hand operation is consistent with the right hand operation, and the following steps are performed only when the consistency check is successful. Specifically as shown in FIG. 4, after the camera device simultaneously takes images of operational motions of the left and right hands on the steering wheel image, hand movement component can determine the position 405 of the left hand in the current cycle and the position 403 of the right hand in the current cycle, and subsequently hand movement component 306 can calculate the left hand movement position difference vector 407 according to the position 405 of the left hand in this cycle and the position 404 of the left hand in the previous cycle as stored in the storage device 206, and the right hand movement position difference vector 406 according to the position 403 of the right hand in the current cycle and the position 405 of the left hand in the previous cycle as stored in the storage device 206.

At 505, it is determined whether the module of the left hand movement position difference vector 406 is consistent with that of the right hand movement position difference vector 407, wherein the calculation method of the vector module is the same as that in common mathematics, and the numerical values are not necessarily exactly the same when it is judged whether the both are consistent with each other, it is acceptable as long as they are in a certain error range. When the consistency check is successful, it is indicated that the left hand operation is roughly consistent with the right hand operation. When the consistency check is unsuccessful, it is indicated that the left hand operation is different from the right hand operation, and thus the process returns to step 505. Due to such a configuration, the driver's operation will not to be misjudged by the control system as steering operations when he performs other operation rather than steering operation with one hand, so that the judgment is more accurate.

At 506, a steering angle and a steering direction is determined according to the movement position difference vectors. In certain implementations, 506 can be performed by a steering angle and direction component the same or the substantially similar to steering angle and direction component 308 described and illustrated herein. Specifically, when it is checked that the module of the left hand movement position difference vector 406 is consistent with that of the right hand movement position difference vector 407, the steering angle and the steering direction are determined according to the right hand movement position difference vector 406 or the left hand movement position difference vector 407. In some embodiments, it is configured that the steering angle and the steering direction are determined according to the right hand movement position difference vector 406. Steering angles and steering directions corresponding to respective movement position difference vectors are pre-stored in the storage device 206, based on which the steering angle and direction component finds out the steering angle and the steering direction corresponding to the right hand movement position difference vector 406.

At step 507, current and voltage can be output to the steering motor 104 serving as an actuating device according to the steering angle and the steering direction determined in step 506, so as to control the output power of the steering motor 104. In certain implementations, 507 can be performed by a control component the same or the substantially similar to control component 310 described and illustrated herein.

At step 508, the steering motor 104 can control the steering of the steering structure 202. In this embodiment, the steering structure 202 can include a steering rack and a steering gear. The steering motor, steering rack and steering gear are similar as those in the existing steering assist system, and will not be described in detail herein. After step 508 is completed, the process returns to Step 505 again after an interval of time has elapsed for the control system, and the steps are repeated as described above.

Figure 6:
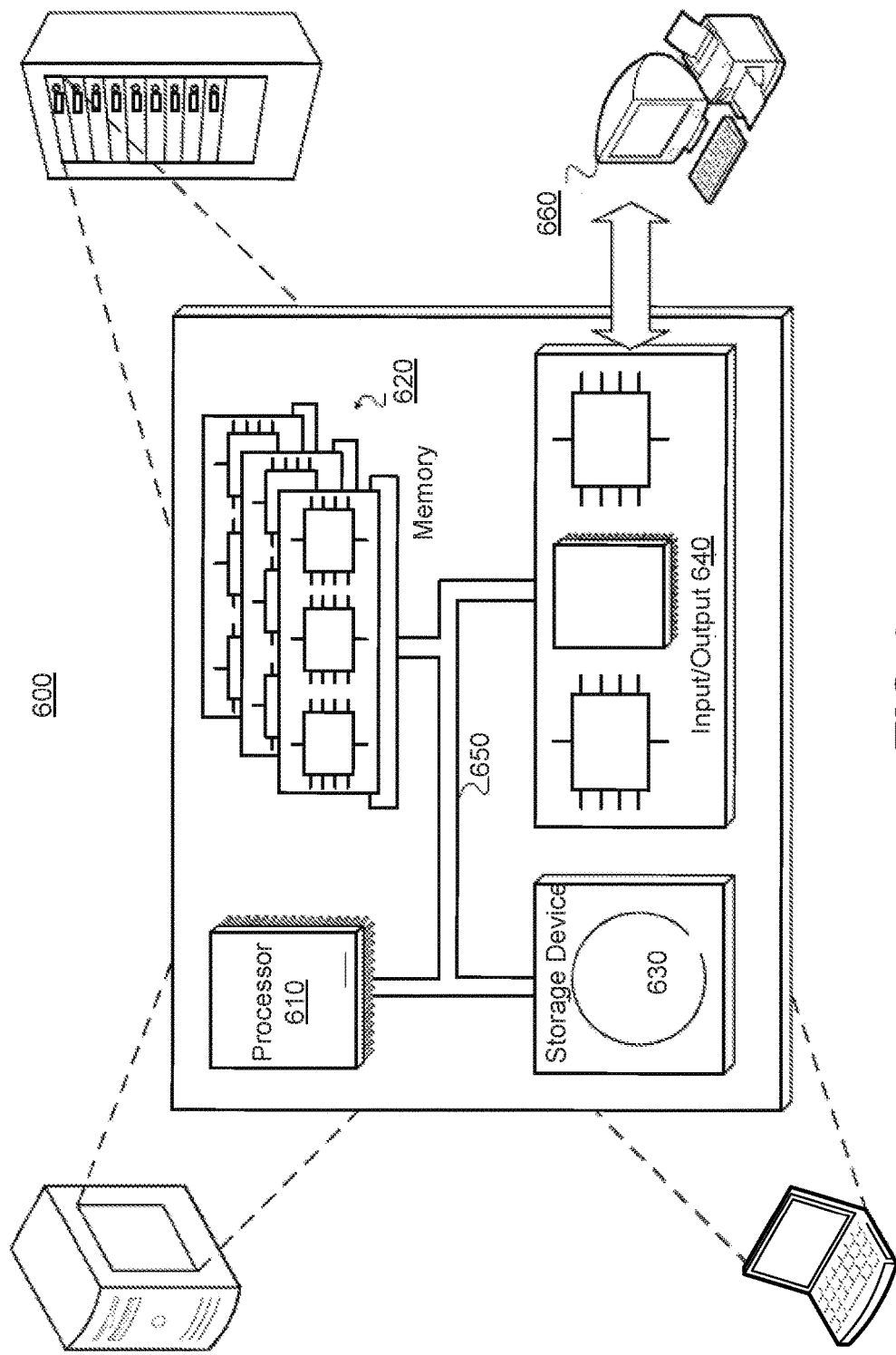
FIG. 6 shows a schematic diagram of an example of a computer system

Referring to FIG. 6, a schematic diagram is shown of an example of a computer system 600. This system is exemplary only and one having skill in the art will recognize that variations and modifications are possible. The system 600 can be used for the operations described above. For example, the computer systems shown in FIG. 6 may be used to implement any or all of the techniques and routines described herein for facilitating a dynamic display of brake force.

The system 600 includes a processor 610, a memory 620, a storage device 630, and an input/output interface 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to provide graphical information via input/output interface 640 for display on a user interface of one or more input/output device 6100.

The memory 620 stores information within the system 600 and may be associated with various characteristics and implementations. For example, the memory 620 may include various types of computer-readable medium such as volatile memory, a non-volatile memory and other types of memory technology, individually or in combination.

The storage device 630 is capable of providing mass storage for the system 600. In one implementation, the storage device 630 is a computer-readable medium In various different implementations, the storage device 630 may be a floppy disk device, a hard disk device, an optical disk device, or a tape device.

The input/output device 6100 provides input/output operations for the system 600. In one implementation, the input/output device 6100 includes a key board and/or pointing device. In another implementation, the input/output device 6100 includes a display unit for displaying graphical user interfaces.

The features described can be implemented in digital electronic circuitry, or in computer hardware, firmware, software, or in combinations of them The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. Although a few implementations have been described in detail above, other modifications are possible.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Where components are described as being configured to perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

A number of embodiments of the invention have been described. Nevertheless, it will be understood that various modification may be made without departing from the scope of the invention.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-7 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A control system for controlling steering of a driving apparatus, wherein the system comprising:
    a projecting device configured to project a steering wheel image on to a surface within the driving apparatus such that a user of the driving apparatus may act on the projected image of the steering wheel;
    a capturing device configured to capture motion data regarding movements of one or two hands on the projected steering wheel image;
    a processor configured by machine-readable instructions to:
        calculate a movement of the one or two hands based on the motion data,
        determine a steering input according to the movement of the one or two hands, and
        output a steering signal according to the steering input direction; and
    an actuating device configured to receive the steering signal and effectuate a maneuver of the driving apparatus according to the steering signal.

2. The control system according to claim 1, further comprising a storage device configured to store positions of the hands; and, wherein
    the processor is further configured to calculate a position difference vector according to the motion data and at least one position of the one or two hands determined at a previous time to form the movement position difference vector.

3. The control system according to claim 1,
    wherein the capturing device is configured to capture motion data of the left and right hands on the steering wheel image; and, wherein
    the processor is configured to:
        separately calculate a left hand movement position difference vector and a right hand movement position difference vector,
        check whether the left hand movement position difference vector is consistent with the right hand movement position difference vector, and,
        in response to determining the left hand movement position difference vector is consistent with the right hand movement position difference vector, determine the steering input according to the left or right hand movement position difference vector.

4. The control system according to claim 1, further comprising a storage device configured to store predetermined steering angles and steering directions corresponding to respective movement position difference vectors.

5. The control system according to claim 1, wherein the actuating device is a steering motor, operative connected to a steering structure having a steering rack and a steering gear.

6. The control system according to claim 1, wherein the driving apparatus includes a vehicle, a motorcycle, a train, a truck, a tram, a vessel, and an aircraft.

7. The control system according to claim 1, wherein the processor is further configured to store the calculated movement of the one or two hands in association with a timestamp.

8. The control system according to claim 1, wherein the steering input includes at least one of a steering angle and steering direction.

9. A method for controlling steering of a driving apparatus, the method being implemented by a processor, the method comprising:
    projecting a steering wheel image on to a surface within the driving apparatus such that a user of the driving apparatus may act on the projected image of the steering wheel;
    capturing motion data regarding movements of one or two hands on the projected steering wheel image;
    calculating a movement of the one or two hands based on the motion data, determining a steering input according to the movement of the one or two hands, and outputting a steering signal according to the steering input direction; and receiving the steering signal and effectuate a maneuver of the driving apparatus according to the steering signal.

10. The method according to claim 9, further comprising calculating a position difference vector according to the motion data and at least one position of the one or two hands determined at a previous time to form the movement position difference vector.

11. The method according to claim 9, wherein capturing motion data regarding movements of one or two hands on the projected steering wheel image comprising capturing motion data for the left and right hands on the steering wheel image, wherein calculating a movement of the one or two hands based on the motion data comprises:

separately calculating a left hand movement position difference vector and a right hand movement position difference vector, and checking whether the left hand movement position difference vector is consistent with the right hand movement position difference vector, and, wherein determining the steering input according to the movement of the one or two hands comprises:

in response to determining the left hand movement position difference vector is consistent with the right hand movement position difference vector, determining the steering input according to the left or right hand movement position difference vector.

12. The method according to claim 9, further comprising storing predetermined steering angles and steering directions corresponding to respective movement position difference vectors.

13. The method according to claim 9, wherein effectuating the maneuver of the driving apparatus according to the steering signal comprises controlling a steering motor in according to the steering signal.

14. The method according to claim 9, wherein the driving apparatus includes a vehicle, a motorcycle, a train, a truck, a tram, a vessel, and an aircraft.

15. The method according to claim 9, further comprising storing the calculated movement of the one or two hands in association with a timestamp.

16. The method according to claim 9, wherein the steering input includes at least one of a steering angle and steering direction.

* * * * *